United States Patent [19]

Thut

[11] 3,724,877
[45] Apr. 3, 1973

[54] SWIVEL JOINT ASSEMBLY
[75] Inventor: Bruno H. Thut, Mentor, Ohio
[73] Assignee: The Carborundum Company, Niagara Falls, N.Y.
[22] Filed: July 16, 1971
[21] Appl. No.: 163,226

[52] U.S. Cl. .....................285/55, 285/281, 285/352
[51] Int. Cl. .............................................F16l 39/04
[58] Field of Search...................285/55, 281, 47, 352

[56] References Cited

UNITED STATES PATENTS

| 3,284,106 | 11/1966 | McIntosh et al.................285/281 X |
| 3,623,751 | 11/1971 | Hulbert ............................285/281 X |
| 3,266,820 | 8/1966 | Leborgne et al.....................285/55 X |
| 3,399,908 | 9/1968 | Kurtz.......................................285/55 |
| 3,307,860 | 3/1967 | Blount et al............................285/55 |
| 1,930,833 | 10/1933 | Barrett.................................285/281 |
| 802,462 | 10/1905 | Martin................................285/99 X |

FOREIGN PATENTS OR APPLICATIONS

| 904,975 | 9/1962 | Great Britain..........................285/55 |
| 1,189,014 | 4/1970 | Great Britain........................285/281 |

Primary Examiner—Thomas F. Callaghan
Attorney—David E. Dougherty et al.

[57] ABSTRACT

In a swivel joint assembly, a housing is rotatably mounted on an open end of a fixed tube. A passage within the housing communicates with the tube for the flow of fluid. Both the passage of the housing and the tube are lined with an inorganic fiber. A ring seal supported in the passage engages another ring seal in the tube for sealing the junction between the tube and the passage.

9 Claims, 2 Drawing Figures

INVENTOR.
BRUNO H. THUT

SWIVEL JOINT ASSEMBLY

BACKGROUND OF THE INVENTION

This invention relates to an improved swivel joint assembly for preventing leakage between two sections of tubing or pipe which are secured together in such a manner so as to permit them to have relative axial turning movement.

SUMMARY OF THE INVENTION

In a swivel joint assembly, a tube has a radial flange spaced from the end thereof. A housing which forms an annular chamber for receiving the flange includes passage communicating with the tube. First and second bearing assemblies are respectively positioned on either side of the flange. Both the interior of the tube and the passage are lined with an inorganic fiber lining capable of withstanding deterioration due to molten metal. At the junction of the tube and the passage a pair of seal rings of a hard material are in registry. Each of the seal rings is supported by a respective fiber lining and is provided with a flat engaging surface.

DETAILED DESCRIPTION OF A PREFERRED EMBODIMENT

Figure 1:
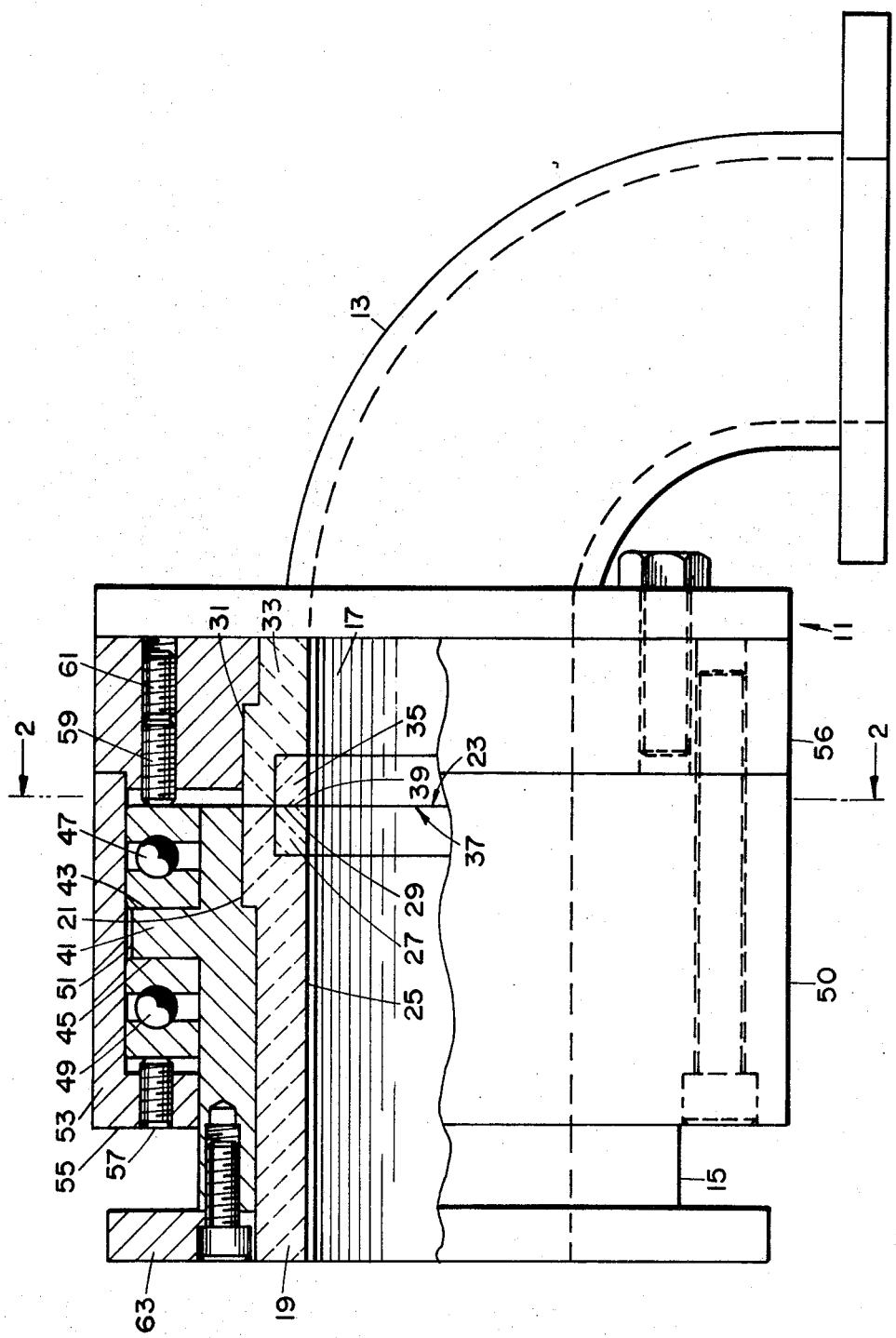
FIG. 1 is a side elevational view shown partially in section along line 1—1 of FIG. 2.
Figure 2:
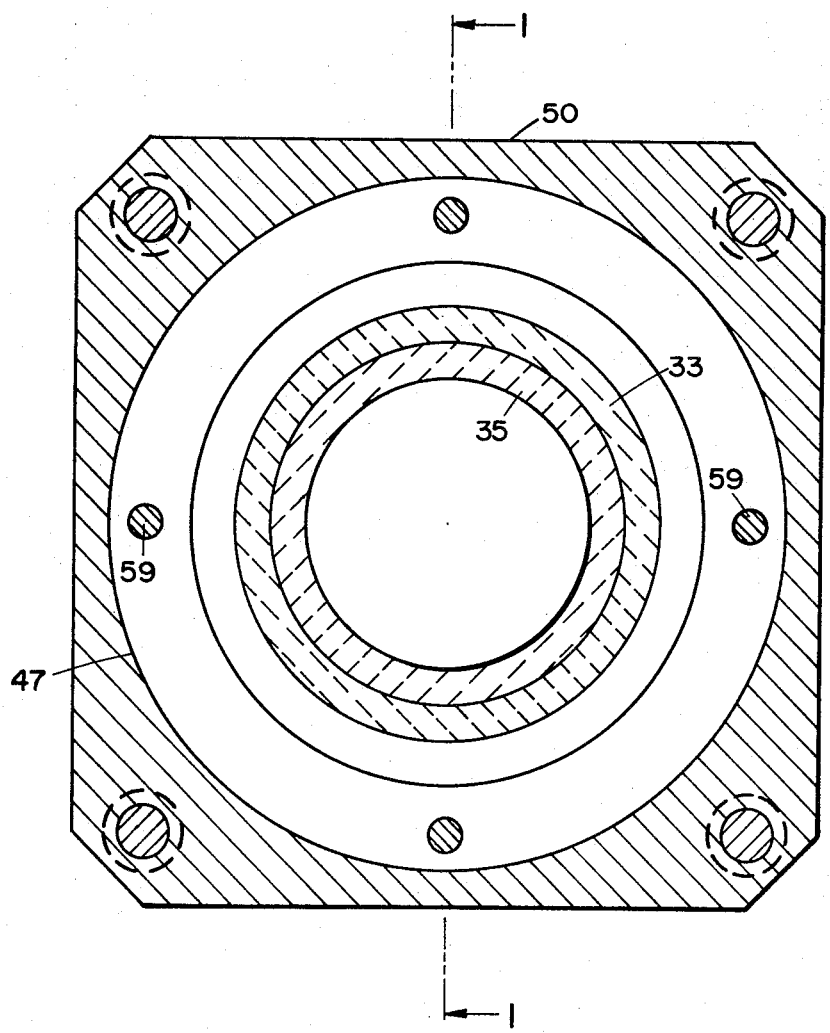
FIG. 2 is a horizontal sectional view along line 2—2 of FIG. 1.

Referring to the drawings in more detail, the reference character 11 indicates the rotatable housing or body to which a swingable discharge conduit 13 is connected. A tube 15 which is in a fixed position communicates with a passage 17 in the housing 11 for the flow of fluid.

The terms upper, lower, inner outer and the like are applied only for convenience of description and should not be taken as limiting the scope of this invention.

The inside surface of the tube 15 is covered with a lining 19 comprising an inorganic fiber capable of withstanding deterioration due to the flow of molten metal. The fiber lining 19 may be braided, woven or in a matted form. Preferably the fiber is formed from a refractory material such as silica, silicon carbide, Fiberfrax ceramic fiber, boron nitride and other suitable heat resistant materials. The fiber lining 19 can be attached to the tube 15 with a suitable cement or fitted as a sleeve.

The outlet or upper end of the tube 15 is provided with a cylindrical groove 21. The lining 19 which conforms to configuration of the groove 21 has a larger diameter at the opening 23 than the diameter of the remaining portion of tube 15 with lining 19 so as to form an enlarged lined portion 25.

A sealing ring 27 of hardened heat resistant material is supported at the opening 23 by the lining 19 in the enlarged lined portion 25 of tube 15. The sealing ring 27 which has an inside diameter approximately equal to that of the lining 19 compresses the fiber lining 19 into the groove 21 so as to hold the lining in a fixed position.

The sealing ring 27 which has a generally rectangular cross section as illustrated in FIG. 1 includes a flat smooth surface 29 to ensure a good seal. Preferably the sealing ring 27 comprises a hard heat resistant material such as silicon carbide, tungsten carbide or other material capable of withstanding deterioration due to the flow of molten metal.

The passage 17 of the housing 11 which is rotatably mounted on the tube 15 is provided with groove 31, fiber lining 33, and sealing ring 35 which are similar to hereinbefore described groove 21, fiber lining 19 and sealing ring 27. Since the mounting of sealing ring 33 in opening 35 at the lower end of the passage 17 is similar to the hereinbefore described mounting of sealing ring 27 in opening 23, it is believed that no additional description is necessary. Sealing rings 27 and 35 are mounted so that the flat or bearing surface 29 is in registry with the bearing surface 39 of sealing ring 35 at the junction of passage 17 and tube 15.

To provide a rotatable mounting of the housing 11, the tube 15 includes an exterior flange 41 which is spaced from the upper end and extends radially. The top face 43 of the flange 41 is provided with a bearing assembly 47 and the bottom face 45 is provided with another bearing assembly 49. The bearing assemblies 47 and 49 are of a conventional type having a plurality of ball bearings disposed between a pair of concentric ball retainer rings.

The lower section 50 of the housing 11 forms an annular chamber 51 for receiving the flange 41 and bearing assemblies 47 and 49. The lower section is cup-shaped having a wall 53 spaced from the tube 15 and concentric therewith. A collar portion 55 of wall 53 forms annular chamber 51.

The upper section 56 of the housing 11 with passage 17 therein is secured to the lower section 50 by bolts passing through boreholes in the collar portion 55 and threaded into matching boreholes in the upper section 56.

Threaded upwardly through the collar portion 55 of the lower section 50 are a plurality of set screws 57 which are disposed in circumferentially spaced apart relationship with their upper or inner ends opposed to the underside of the ball bearing assembly 49. Each of the set screws 57 is provided at its outer or lower end with a head, preferably of polygonal shape, by which it can be turned. In a similar manner threaded downwardly through the upper section 56 are a plurality of set screws 59 which are circumferentially spaced with their inner ends opposed to the upper side of ball bearing assembly 47. These set screws 59 may likewise be adjusted. As illustrated in the drawings a plurality of lock screws 61 are provided for the set screws 59.

By adjusting either screws 57 or 59 in a proper manner the assembly may be adjusted to compensate for wear on the bearings. By unscrewing the upper set of set screws 59 and tightening the lower set of set screws 57, the housing can be shifted downwardly with respect to the fixed tube 15 so the pressure on the sealing rings 27 and 35 between the tube 15 and the passage 17 may be adjusted.

The lower end of the fixed tube 15 is provided with a flange 63 for securing the tube 15 to a conduit connected to a source of molten metal.

The present invention provides a simple, effective and safe seal between a pair of relatively rotating pipes which is effective in withstanding the high temperatures and corrosive effects of molten metals, especially molten aluminum.

While preferred embodiments of this invention have been described and illustrated, it is to be recognized that modifications and variations thereof may be made without departing from the spirit and scope of this invention as described in the appended claims.

What is claimed is:

1. A swivel joint assembly comprising a tube, having an open end, a housing having a passage communicating with the end of said tube at the junction of said tube and the passage for the flow of fluid, means for holding said tube and said housing in swiveling relationship, first and second fiber linings, respectively, covering the inside surface of said tube and said passage, said fiber comprising an inorganic fiber capable of withstanding deterioration due to the flow of molten metal, first and second seal rings, respectively, positioned internally of said first and second linings and compressing said first lining between said first seal ring and the internal surface of said tube, and said second lining between said second seal ring and said passage of said housing, said seal rings being spaced from said tube and said housing, said first seal ring being in abutting engagement with said second seal ring at the junction of said tube and said passage, to provide a fluid tight seal and to allow relative rotation therebetween said seal rings comprising a hard heat resistant material.

2. A swivel joint assembly according to claim 1 wherein said tube is provided with a first groove and said passage is provided with a second groove, said first and second grooves being provided at the junction of said tube and said passage for supporting said first and second fiber lining, respectively.

3. A swivel joint assembly according to claim 2 wherein said first and second fiber linings are, respectively, compressed between said first seal ring and said first groove and said second seal ring and said second groove.

4. A swivel joint assembly according to claim 1 wherein said first and second seal rings are provided with flat smooth bearing surfaces.

5. A swivel joint assembly according to claim 1 wherein said tube includes a radially extending flange, said housing includes a lower section forming an annular chamber about said flange, a first and second bearing assembly, respectively, disposed on either side of said flange within the annular chamber.

6. A swivel joint assembly according to claim 5 comprising means for adjusting pressure on said first and second sealing rings.

7. A swivel joint assembly according to claim 6 wherein said adjusting means comprises a first and second plurality of set screws for adjusting said first and second bearing assemblies, respectively.

8. A swivel joint assembly comprising a tube having an open end, a housing having a passage communicating with the open end of said tube for the flow of fluid, said passage having an open end spaced from the open end of said tube at the junction of said tube and the passage, said tube including a radially extending flange, said housing including a section forming an annular chamber about said flange, a first and second bearing assembly, respectively, disposed on either side of said flange within the annular chamber for holding said housing and said tube in swiveling relationship, first and second fiber linings, respectively, covering the inside surface of said tube and said passage, said fiber comprising an inorganic fiber capable of withstanding deterioration due to the flow of molten metal, said tube being provided with a first groove at the open end thereof, said passage being provided with a second groove at the open end thereof, first and second seal rings, respectively, compressing said first fiber lining between said first seal ring and said first groove and said second fiber lining between said second seal ring and said second groove, said first and second seal rings being provided with flat, smooth bearing surfaces being in registry with each other at the junction of said tube and said passage, said seal rings comprising a hard, heat resistant material.

9. A swivel joint assembly according to claim 8 including a first and second plurality of set screws for adjusting the pressure on said first and second seal rings.

* * * * *